G. S. DUNKLE & M. M. TAWNEY.
LOCK NUT.
APPLICATION FILED MAR. 23, 1910.
973,640.
Patented Oct. 25, 1910.
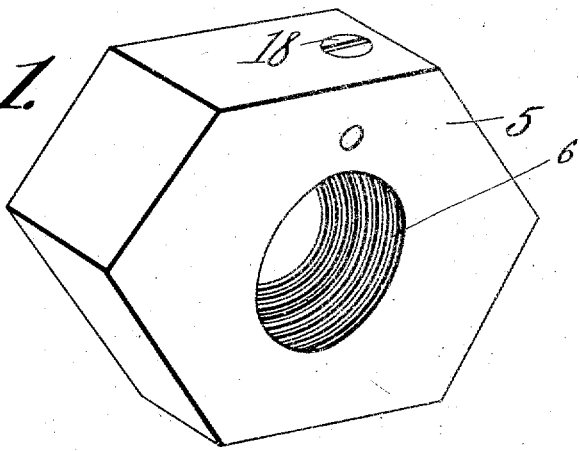
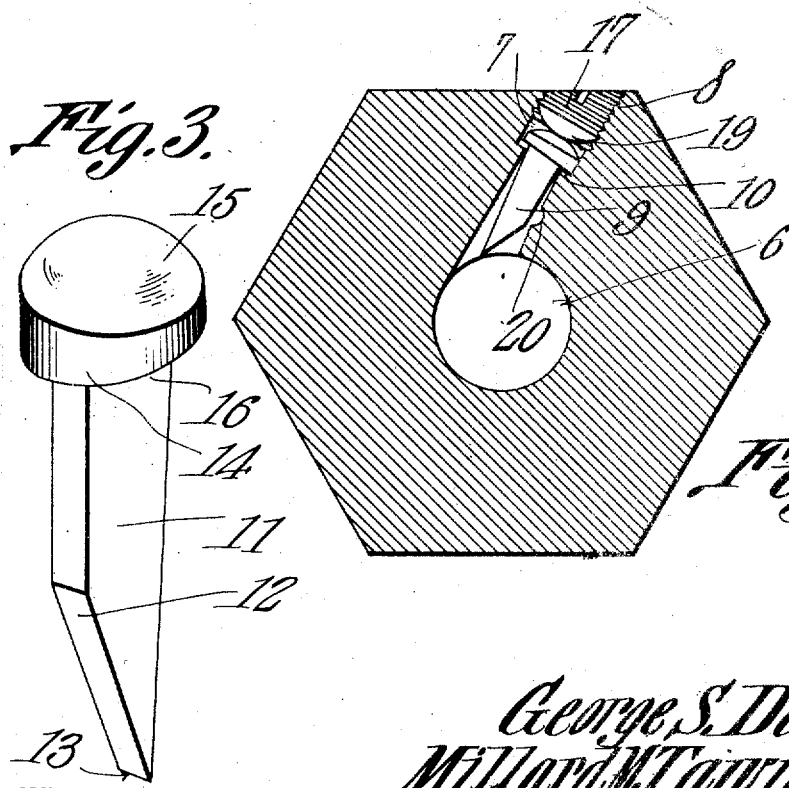

UNITED STATES PATENT OFFICE.

GEORGE S. DUNKLE AND MILLARD M. TAWNEY, OF HARRISBURG, PENNSYLVANIA.

LOCK-NUT.

973,640.

Specification of Letters Patent.

Patented Oct. 25, 1910.

Application filed March 23, 1910. Serial No. 551,084.

*To all whom it may concern:*

Be it known that we, GEORGE S. DUNKLE and MILLARD M. TAWNEY, citizens of the United States, residing at Harrisburg, in the county of Dauphin and State of Pennsylvania, have invented a new and useful Lock-Nut, of which the following is a specification.

It is the object of the present invention to provide an improved lock nut, the primary aim of the invention being to provide a lock nut which may be applied to any ordinary bolt.

A further object of the invention is to so construct the lock nut that it may be manually removed from the bolt when desired without destroying either the nut or the bolt.

In the accompanying drawings,—Figure 1 is a perspective view of a lock nut embodying the present invention. Fig. 2 is a vertical sectional view therethrough. Fig. 3 is a perspective view of the locking tooth of the device.

In the drawings, the lock nut is indicated by the numeral 5 and is formed with the usual bolt opening 6. The nut is further formed with a bore 7 which for the major portion of its length is threaded as at 8 and this bore opens into another bore which is indicated by the numeral 9 and is rectangular. Further, the bore 9 opens into the bolt opening 6 and is gradually broadened from that end which opens into the bore 7, to that end which opens into the bolt opening 6. Axially, the two bores 7 and 9 are in alinement and their axis is tangential to the bolt opening 6 and inasmuch as the bore 9 is of less dimensions than the bore 7, a shoulder 10 is formed at the junction of the two bores and the function of this shoulder will presently be explained.

The element which locks the nut to the bolt is in the nature of a tooth which is indicated by the numeral 11, as clearly shown in Fig. 3 of the drawings. In cross section, this tooth is rectangular and at its lower end is beveled, as at 12, to afford a biting edge 13 at its extremity.

At its end opposite its beveled end, the tooth is formed with a head 14, the upper surface of which is convex, as indicated by the numeral 15, and as clearly shown in Fig. 2 of the drawings. The under side of the head is beveled, as at 16, so that that side of the said head which is located at the beveled side of the tooth is thicker or higher than the diametrically opposite side. This tooth is inserted into the bore 9 with its head resting within the bore 7 and upon the shoulder 10. It will be observed that the pointed end of the tooth projects to that end of the bore 9 which opens into the bolt opening of the nut. Into the bore 7 there is threaded a plug 17 the outer end of which is beveled, as at 18, and the inner end of this plug is convex, as at 19, and when the said plug is threaded into the bore 7, this convex inner end comes into engagement with the convex surface of the head 14 of the tooth in the manner illustrated in Fig. 2 of the drawings. It will be observed from inspection of the said figure of the drawings that owing to the beveled under side of the head 14, the head will normally rest only at its thicker portion upon the said shoulder 10 and its opposite portion will be slightly spaced from the said shoulder. With the parts in this position, the nut is threaded upon an ordinary bolt and the plug 17 is then further threaded into the bore 7 and will depress the thinner portion of the head 14, thereby rocking the tooth and causing its biting edge 13 to bite into the threads of the bolt whereby to prevent backward rotation of the said nut upon the bolt. In order, however, that the nut may be removed from the bolt when desired, an opening 20 is formed through the front of the nut and transects the bore 9 and a nail or other like element may be inserted in this opening whereby to restore the tooth to normal position and to disengage it from the threads of the bolt.

What is claimed is:

1. A nut having a bore communicating with its bolt opening, a tooth mounted in the bore to rock, and a plug fitted in the bore and bearing against the said tooth, the said plug being adjustable whereby to rock the tooth.

2. A nut having a shouldered bore communicating with its bolt opening, a tooth fitted in the bore and having a head resting partly upon the said shoulder, and a plug threaded into the bore and bearing against the head of the tooth, the said plug being adapted to depress the head and rock the tooth.

In testimony that we claim the foregoing as our own, we have hereto affixed our signatures in the presence of two witnesses.

GEORGE S. DUNKLE.
MILLARD M. TAWNEY.

Witnesses:
HARRY H. WALTON,
SIMON PAGE.